July 14, 1942. K. G. ANDERSON 2,290,009
LIGHTING FIXTURE
Filed Oct. 3, 1940 2 Sheets-Sheet 1
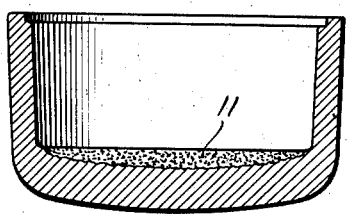
Fig. 1.
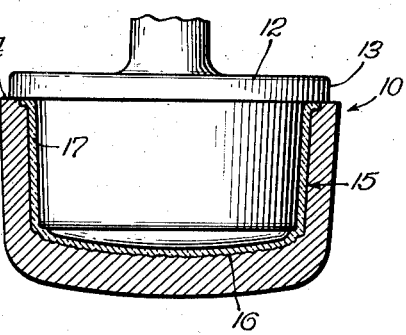
Fig. 4.
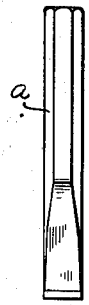 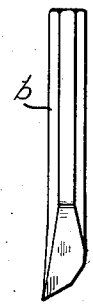  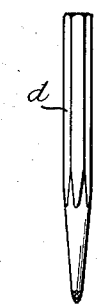  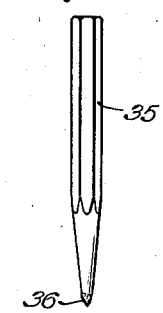
Fig. 2A.  Fig. 2B.  Fig. 2C.  Fig. 2D.  Fig. 2E.  Fig. 3A.
 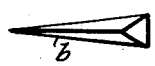   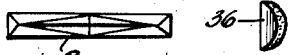 
Fig. 2F.  Fig. 2G.  Fig. 2H.  Fig. 2I.  Fig. 2J.  Fig. 3B.
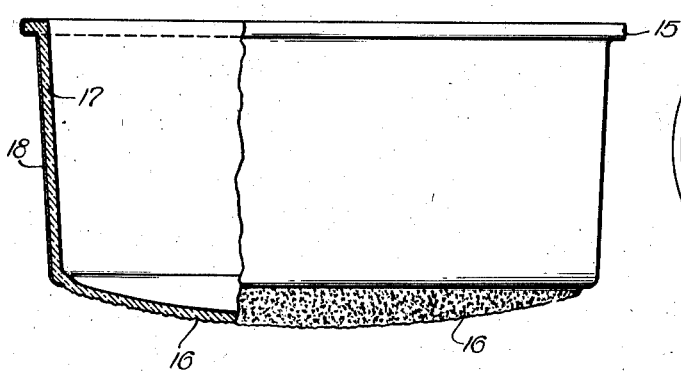
Fig. 5.
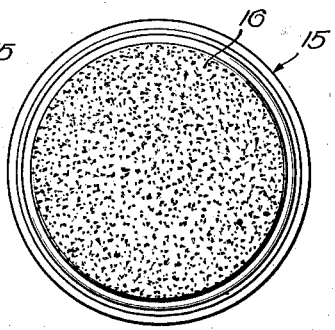
Fig. 6.
INVENTOR.
Kador George Anderson
BY Soans, Pond, & Anderson
Attys.

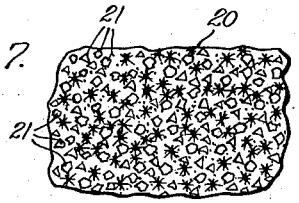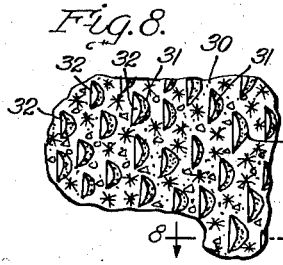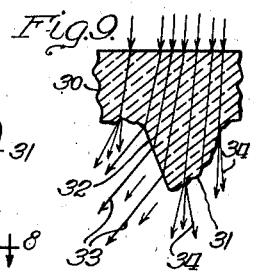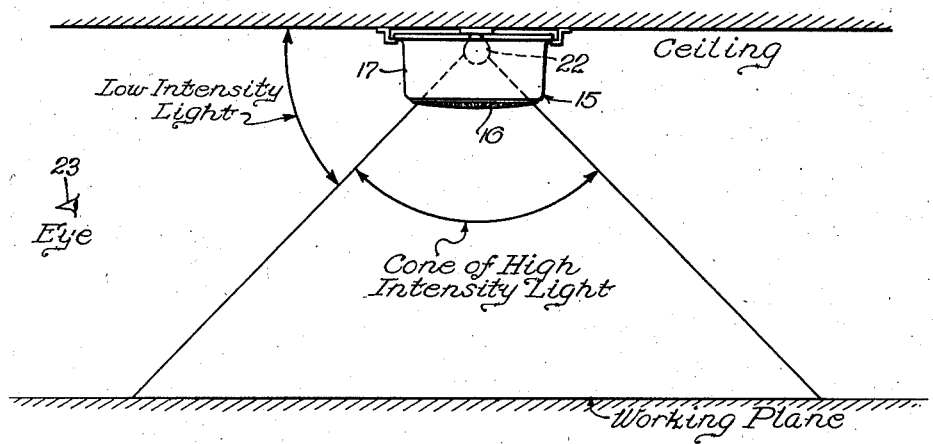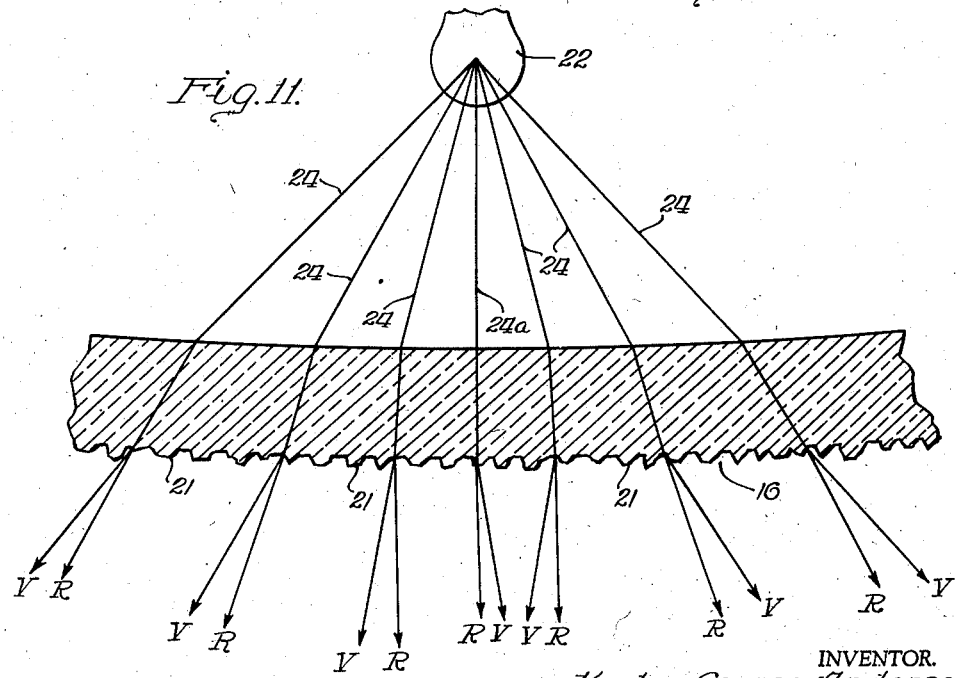

Patented July 14, 1942

2,290,009

UNITED STATES PATENT OFFICE 2,290,009

LIGHTING FIXTURE

Kador George Anderson, Chicago, Ill., assignor of one-half to Edward Berndt and Elizabeth Berndt, Chicago, Ill.

Application October 3, 1940, Serial No. 359,481

1 Claim. (Cl. 240—106)

My invention relates, generally, to lighting fixtures for shading incandescent lamps and other concentrated lighting sources, and it has particular relation to such lighting fixtures having an improved structure of diffusing surface and to methods and mold equipment for making the same.

In lighting arrangements where incandescent filaments, carbon arcs, or other concentrated light sources are used, it is ordinarily necessary to provide means for softening the glare from these sources. The basic principle employed in reducing the glare from such concentrated sources is to cover or shade these sources with some type of light diffusing means, ordinarily in the form of globes or other suitably shaped lighting fixtures.

Diffusion of transmitted light is generally considered as being of two different types. One of these types of light diffusion is caused by foreign material in or on glass or similar materials. The other type of diffusion is due to the refraction of light at one or both surfaces of clear glass or other transparent material, the surface of which is irregular. Experimental measurements on a considerable number of samples of both kinds of light diffusing glass show that diffusing glass made by adding foreign material or pigment to the glass absorbs a considerably higher percent of the light transmitted therethrough than is absorbed by diffusing glass made by altering the surface of clear glass from a flat, smooth surface to an irregular one. That is, light diffusion of the second type by refraction is much more efficient in respect to the percent of light transmitted than light diffusion of the first type through a pigmented material.

An important object of this invention is to provide a new form of irregular diffusing surface of the light refracting type for lighting fixtures characterized by an unusually high efficiency of light transmission and diffusion. The mold equipment for making lighting fixtures provided with such diffusing surfaces together with the method of making this mold equipment also form a part of the present invention.

Another important object of my invention is to provide lighting fixtures with light diffusing surfaces of the light refracting type having the property of transmitting a substantially greater percentage of light in one desired direction than in other directions. The mold equipment for providing lighting fixtures with this type of diffusing surface, together with the method of making this mold equipment, also form a part of my invention.

A very important feature of the irregular light diffusing surfaces made according to this invention is that these surfaces are microscopically smooth and thus do not lose their light transmitting efficiency due to collection of dirt and dust which cannot be easily removed by washing and cleaning.

In making lighting fixtures, such as globes and shades for incandescent lamps and the like, according to the invention, the bottoms of these fixtures will usually be clear and provided with my new structure of irregular diffusing surface, while the sides of the fixture will ordinarily be of the pigmented, translucent diffusing type. Molds for these fixtures may be formed of iron and the molding surface for the irregular diffusing surface is made by driving variously shaped punches or tools into the mold surface in a random manner. The result is a mold surface closely filled with randomly arranged discrete pockets of sharp outlined, mixed, geometrical shapes. The fixtures are formed in these molds by pressing or blowing depending upon shape and thickness. The bottoms of these fixtures will thus be provided with microscopically smooth diffusing surfaces substantially completely covered with randomly arranged, discrete, molded projections in the form of predetermined, sharp outlined, varied geometrical shapes. These projections on the diffusing surface collectively include a large number of microscopically smooth light refracting plane surfaces disposed at various angles to each other, and may be picturesquely described as being in the form of variously shaped warts.

The mold equipment and method of forming lighting fixtures having my particular type of irregular diffusing surface which transmits a higher proportion of light in one direction than in other directions is, in general, similar to the above described mold equipment and method, as will appear hereinafter.

It will also be understood that the irregular diffusing surfaces need not be at the bottom of the fixtures but may be otherwise located, and that these fixtures may be made in a number of different shapes and designs.

For a more complete understanding of the nature and scope of my invention, reference may now be had to the following detailed description thereof taken in connection with the accompanying drawings, in which:

Figure 1 is a vertical sectional view of a mold used in forming lighting fixtures according to this invention;

Figures 2A, 2B, 2C, 2D and 2E are elevational views of a representative group of tools which may be used in forming the mold shown in Figure 1;

Figures 2F, 2G, 2H, 2I and 2J are enlarged end views of the points of the tools shown respectively in Figures 2A, 2B, 2C, 2D and 2E;

Figure 3A is an elevational view of a tool which may be used in making a mold surface wherein a lighting fixture is provided with the type of diffusing surface which transmits a higher concentration of light in one direction than in another direction;

Figure 3B is an enlarged end view of the point of the tool shown in Figure 3A;

Figure 4 is a partially vertical sectional view showing the formation of a lighting fixture in the mold of Figure 1;

Figure 5 is a fragmentary elevational view of a finished lighting fixture or globe that may be formed in the mold shown in Figures 1 and 4, and illustrates one embodiment of the invention;

Figure 6 is a bottom plan view of the fixture shown in Figure 5;

Figure 7 is a magnified or enlarged view of a section of the bottom diffusing surface shown in Figure 6;

Figure 8 is a magnified or enlarged plan view of a form of diffusing surface that refracts a higher concentration of light in one direction than in other directions;

Figure 9 is a sectional view taken on line 8—8 of Figure 8 diagrammatically showing the manner in which a higher proportion of transmitted light is refracted in one direction;

Figure 10 is a diagrammatic view showing the distribution of light transmitted through the lighting fixture shown in Figures 5 and 6; and, Figure 11 is an enlarged diagrammatic view illustrating the manner in which light rays are refracted at the diffusing surface shown in Figures 6 and 7.

Referring now to the drawings, in Figure 1 a mold is indicated generally at 10 in which lighting fixtures may be pressed and provided with my new type of diffusing surface. The mold 10 is cup-shaped and may be formed of iron or other suitable material by casting or forging. Initially, the mold 10 is formed with a smooth inside surface. Subsequently, the bottom inside surface of the mold 10 is provided with a pocketed surface 11 in which glass or similar transparent material may be pressed or cast and provided with my new type of diffusing surface.

In forming the pocketed surface 11, the mold 10 is heated to remove the temper and hardness, and then tools, such as the punches and chisels $a$, $b$, $c$, $d$ and $e$, shown in Figures 2A, 2B, 2C, 2D, 2E, 2F, 2G, 2H, 2I and 2J are driven into the bottom of the mold 10. It will be noted that the tools shown have different shaped ends each including one or more cutting edges and a plurality of plane surfaces at angles to each other and meeting in said edge or edges. Tools having other shaped generally similar ends may also be used in forming the pocketed surface 11. These tools are driven into the surface into the bottom of the mold in a random manner to depths up to about one-quarter of an inch. In this manner the bottom molding surface 11 of the mold 10 is closely filled with discrete pockets of predetermined, sharp outlined, mixed, geometrical shapes, corresponding to the different shaped ends of the tools or punches used. After the pocketed surface 11 has been thus formed, the mold is retempered to give it proper hardness after which it may be used for forming lighting fixtures.

In forming a light fixture in the mold 10, the mold is heated, and a mass of plastic or molten glass is dropped thereinto. A cooperating molding and pressing plunger 12 is forced into the mold 10 as shown in Figure 4 of the drawings. The plunger 12 forces the molten glass into the space between the outside thereof and the inside of the mold 10. When the plunger 12 has been forced all the way into the mold 10, and the upper shoulder 13 rests against the top edge 14 of the mold, the glass will then have been formed into the shape of a lighting fixture 15. The operators, through experience, are able to judge very accurately the amount of glass necessary to form each particular type of fixture so that there will be a minimum of excess glass forced out of the mold 10.

After the formation of the lighting fixture or globe 15, the plunger 12 is withdrawn, and the fixture 15 is removed from the mold 10 by turning it upside down and jarring it loose. The fixture 15, after being removed from the mold 10 is passed through an annealing leer to relieve strains set up during pressing and to anneal the same. The annealing temperatures will vary for different types and thicknesses of glass, but in any case should not be so high that the sharp outlines of the projections of the bottom diffusing surface 16 begin to fuse and lose form. A lighting fixture is thus formed having smooth transparent sides and a bottom diffusing surface 16 which is substantially completely covered with close, randomly arranged, discrete, molded projections or warts in the form of different sharp outlined, geometrical shapes corresponding to the pockets in the molding surface 11.

In most instances it will be desirable to make the side 17 of the fixture 15 also diffusing by baking or diffusing a pigment or enamel thereto. One satisfactory method of providing the sides 17 of the fixture 15 with such a surface, is to place a protecting hood or cone over the bottom surface 16 and then spray a ceramic cement onto the sides 17. After the sides have been thus coated, the fixture 15 is again passed through another leer to bake and fuse the ceramic cement thereto. The finished lighting fixture 15 is shown in Figures 5 and 6 with the enamel surface 18 on the sides 17 thereof.

Referring to Figure 7 of the drawings, an enlarged section 20 of the clear irregular fusing surface 16 is shown, filled with projections 21. In one lighting fixture made according to this invention, many of the projections were in the order of one-sixteenth to one-eighth of an inch in height, and varied from one-sixteenth to three-sixteenths of an inch in diameter or crosswise dimension at their base. A number of smaller and larger projections 21 were randomly interposed among the projections of more or less uniform size. It will be understood that other diffusing surfaces may be made embodying the invention which have the projections in different sizes and in different ranges of distribution. The projections 21 are formed in the different pockets in the pocketed molding surface 11, Figure 1. Molds may be provided with different forms of pocketed molding surfaces to give desired forms or types of diffusing surfaces.

Although the surface 16 is highly irregular, it is at the same time microscopically smooth. By this is meant that all portions of the surface, including the surfaces of the projections, are free from any roughness discernible under a microscope. Light diffusing surfaces of the irregular refracting type have been provided heretofore by sand blasting glass. However, such sand-blasted surfaces are microscopically rough and catch and hold dirt permanently. The diffusing surface 16, on the other hand, being microscopically smooth, collects only a comparatively small amount of dirt and dust and this may be entirely and easily washed or wiped therefrom. This difference in smoothness is an important factor where lighting fixtures are used in dirty and dusty places such as in railway cars, busses, factories and cities.

In Figure 10 the fixture 15 is shown supported over an incandescent lamp 22 at a ceiling. This type of lighting fixture 15 is particularly suitable for use in railway passenger cars or similar applications where they must be rugged and able to withstand rather severe vibration and shock. The cone of light transmitted through the bottom refracting surface 16 and striking the so-called working plane is of high intensity, while the band of light transmitted through the pigmented or translucent side walls 17 is of lower intensity. By way of specific illustration, the fixture 15 may be considered as shading the electric light bulb 22 in the ceiling of a railway passenger car. The working plane receiving the high concentration of light may in this case be the sides of the car where passengers read and work, while the eye 23 may be that of a person standing in the aisle of the car where a high degree of illumination is neither required nor desired.

In Fig. 11 of the drawings, the manner in which the light rays are refracted and diffused on passage through the diffusing surface 16 of the lighting fixture 15 is shown. Light rays 24 radiate from the incandescent filament of the lamp 22 and strike the inside surface of the bottom of the lighting fixture at different angles. Each of the light rays 24 on passing through the glass bottom will be bent towards the normal to the inside surface at that point, except the central light ray 24a which strikes normally to the inside surface and passes through the glass bottom without bending. The light rays 24 emerge through the bottom at the diffusing surface 16. The general principle governing the diffusion at the surface 16, is that light emerging from glass, or other similar medium, at any point is bent away from the normal to the surface of the glass at that point. Since the diffusing surface 16 is highly irregular, the normals to this surface will extend randomly in all directions, within limits. Hence the light rays 24 on emerging at the diffusing surface 16 will be diffused in all directions. Since the light rays 24 are composed of light of different wave lengths, they will be broken up into light rays of different wave lengths on leaving the surface 16, as indicated by the arrows marked V and R. The V arrows designate the violet end of the spectrum which is bent more than the red end designated by the arrows R. However, a spectrum color effect is not obtained, since the diffusing or refracting surface 16 causes the light rays of different wave lengths to be intermixed to form white light, which is a mixture of all colors.

As the normals to the surfaces of the projections 21 making up the diffusing surface 16 extend uniformly in different directions, the light beam or cone of light passing through the diffusing surface will be of uniform intensity. That is, referring to Fig. 10 of the drawings, the unit intensity of illumination over the working plane will be substantially uniform. In certain instances however, it is desirable to have a higher degree of illumination in one direction than in the other. A diffusing surface capable of transmitting a higher concentration of light in one direction than in others may be made as one embodiment of the invention by shaping the irregular projections so that the normals to the surfaces thereof lie predominately in one direction while extending randomly in all other directions. An example of this type of surface is shown in Figs. 8 and 9 of the drawings.

In Figures 8 and 9 a section 30 of this type of diffusing surface is shown having a number of projections 31 which are orientated in the same general direction and have one flat or plane surface 32, while being irregular in shape over the remainder or the rest of the surface. The character of light diffusion from these projections 31 is shown in the enlarged diagram in Fig. 9. The light rays 33 leaving the surface 32 will extend substantially parallel to each other, while the other light rays 34 leaving the surface of the projection 31 will extend randomly in all directions. That is, each of the projections 31 serves to refract a higher concentration of light in a certain direction, while refracting or distributing the light uniformly in all other directions.

In the surface section 30, the projections 31 are shown to be dispersed in a relatively high concentration among other varied shaped projections interspersed therebetween. The degree to which the light is diffused in a preferred direction may be controlled by the number of the projections 31 as compared with the total number of projections and by shifting the alignment or orientation of these projections. The truer the alignment of the surfaces 32, the more intense will be the light beam refracted from these surfaces. It will be understood that the projections 31 may have different shapes so long as the normals to each projection lie or extend predominately in one general direction, while extending randomly in all other directions.

In order to form the diffusing surface 30, it is necessary that the molding surface be provided with pockets in which the normals to the side surfaces lie predominately in at least one general direction while extending randomly in other directions, and to have these pockets aligned or orientated in the desired direction. In Figs. 3A and 3B a tool 35 is shown which may be used for forming this special type of pocket. As shown, particularly in Fig. 3B, the end of the tool 35 has a plane surface 36 while the surface is irregular on the rest of the sides preferably consisting of a number of smaller plane surfaces at various angles to each other. When this tool 35 is used it is held or turned in the same general direction in each instance and driven into the surface of the mold in the desired number of places. Hence, when the glass is pressed or blown into the molding surface having these special pockets, it will be provided with projections of a type corresponding to the projections 31 in Figs. 8 and 9.

The particular lighting fixture 15 shown is cup-shaped and has a wide opening at the top.

It will be understood that lighting fixtures may be formed according to the invention with much smaller necks in any of the usual commercial shapes. Ordinarily these fixtures when used in buildings may be much thinner than the lighting fixture 15 as they do not have to withstand vibration and shock. Accordingly, fixtures or globes of this type may be blown into a mold instead of pressed. It will be understood that the diffusing surfaces 16 and 30 may be formed by pressing the glass or blowing it as the case may be.

Since certain further changes may be made in the foregoing constructions and techniques, and different embodiments and modifications of the invention may be made without departing from the scope thereof, it is intended that all matter described hereinbefore or shown in the accompanying drawings shall be interpreted as illustrative and not in a limiting sense, and that the appended claim be given the broadest construction consistent with the prior art.

I claim:

A lighting fixture for shading light bulbs and the like having side and bottom diffusing surfaces, the side diffusing surfaces of the fixture being translucent, and the bottom of the fixture being crystal clear and having at least one surface thereof substantially completely covered with closely arranged, discrete, integral projections in the form of predetermined, sharp outlined, varied geometrical shapes, said projections collectively including a large number of microscopically smooth light refracting plane surfaces disposed at various angles to each other; the normals to said discrete molded projections lying predominantly in one general direction so as to give a higher intensity of illumination in that direction, and extending randomly in all other directions.

KADOR GEORGE ANDERSON.